(No Model.)
R. O. BINGHAM.
HORSE HAY RAKE.
No. 287,613.  Patented Oct. 30, 1883.
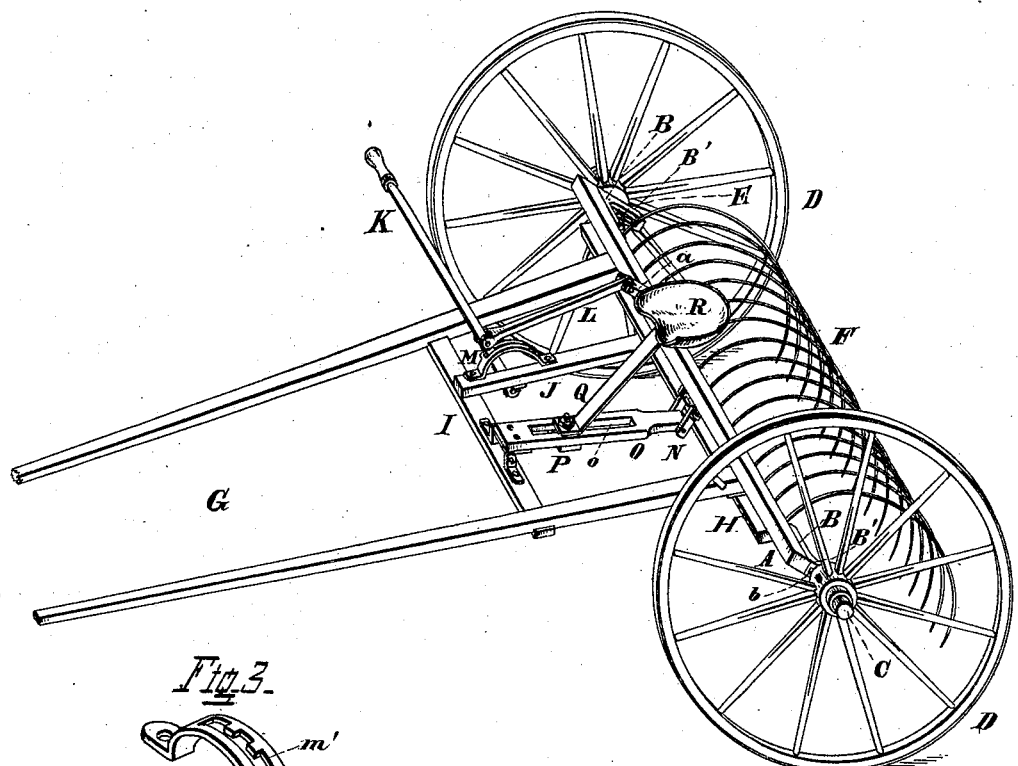
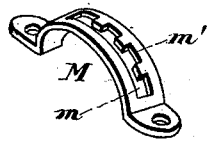
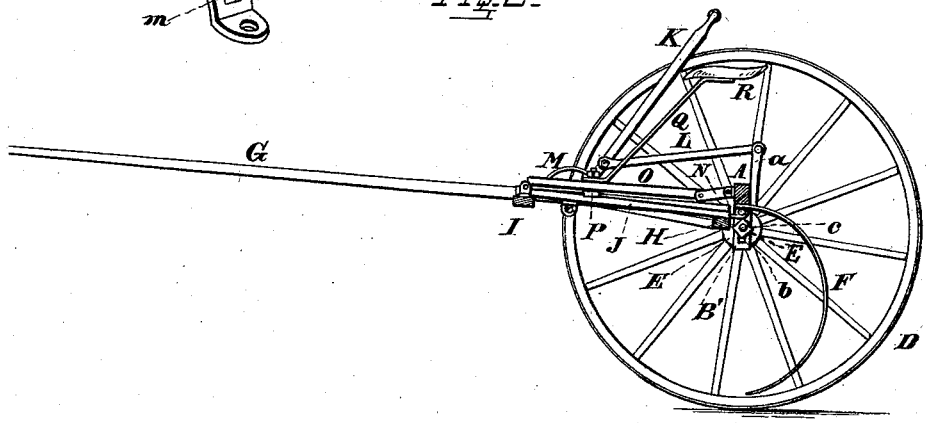
Attest
Carl Spengel
Wm. F. Sayers
Inventor
Robert O. Bingham
by Knight Bros.
Atty's

UNITED STATES PATENT OFFICE.

ROBERT O. BINGHAM, OF SIDNEY, OHIO.

HORSE HAY-RAKE.

SPECIFICATION forming part of Letters Patent No. 287,613, dated October 30, 1883.

Application filed November 20, 1882. (No model.)

*To all whom it may concern:*

Be it known that I, ROBERT O. BINGHAM, of Sidney, Shelby county, Ohio, have invented new and useful Improvements in Sulky Hay-Rakes, of which the following is a specification.

My invention relates to improved means for enabling the driver to dump the rake.

In the accompanying drawings, Figure 1 is a perspective view of a sulky hay-rake embodying my improvements, the implement being shown in its dumping condition. Fig. 2 is a vertical section, showing the parts in their working condition. Fig. 3 is a perspective view of the lever-yoke.

To the under side of the axle A, at the ends thereof, are screwed or bolted angle-irons B, whose vertical limbs B' have slotted orifices $b$ for shanks $c$ of spindles C of the ground-wheels D. The said shanks $c$ are screw-threaded for nuts E, by which said spindle may be secured at any desired elevation in said slots, and by so doing the rake-teeth be held at any desired proximity to the ground.

To the axle or rake-head A are made fast the rake-teeth F in any customary or approved way, so that their tips, when in working position, are vertically under the axle, the rake-teeth being elevated just enough to pass over the ground without entanglement with its asperities. Such elevation is made permanent by screwing home the nuts E, aforesaid.

Hinged or coupled to the axle or rake-head A is a pair of thills, G, having cross-bars H I, which support a longitudinal timber, J, to which is pivoted a lever, K, that is coupled by rod L with an arm, $a$, which projects upward from the rake-head. The lever K plays within a slot, $m$, in the yoke M, the notches $m'$ enabling the operator to secure the lever, and consequently the rake-teeth, in any desired position.

Hinged to the cross-bar I at one end, and to stirrup N, having hinge attachment to the axle or rake-head A at its other end, is a bar, O, having a slot, $o$, in which is adjustably secured by the nutted bolt P the leg Q of the driver's seat R.

When the operator wishes to dump the rake, he simultaneously presses the lever K forward and his body rearward, and in so doing partially rotates the axle or rake-head A forward, so as to lift the teeth F backward and upward clear of the ground, and discharge whatever may have been collected upon them.

The slot $o$ enables the setting forward or backward of the driver's seat to suit the weight of the driver. The seat being set back for a driver of light weight enables him to act with greater purchase or leverage in the rearward thrust of the seat, and by so doing to dump as heavy a load as may be desired.

I am aware that the driver's seat in sulky hay-rakes has been made adjustable, and I therefore disclaim novelty in such adjustability, separately considered.

I claim herein as new and of my invention—

In a sulky hay-rake, the combination of a gang of dumping rake-teeth, F, the thill-frame flexibly connected to the rake-head, the arm $a$ on said head, the lever K, pivoted to the thill-frame, the connecting-rod L, the stirrup N, hinged to the rake-head, the pivoted bar O, having the slot $o$, the driver's seat Q R, and the bolt P, whereby the seat may be adjusted at the desired point of leverage, substantially as set forth.

In testimony of which invention I hereunto set my hand.

ROBERT O. BINGHAM.

Attest:
GEO. H. KNIGHT,
SAML. S. CARPENTER.